J. O. FOWLER.
SAFETY TREAD.
APPLICATION FILED APR. 29, 1920.
Reissued July 5, 1921.
15,137.
2 SHEETS—SHEET 1.
Fig. 1.
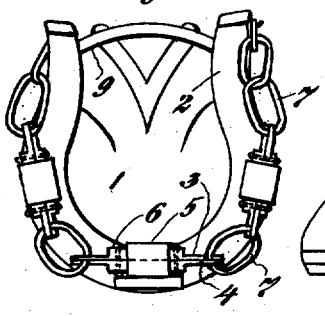
Fig. 2
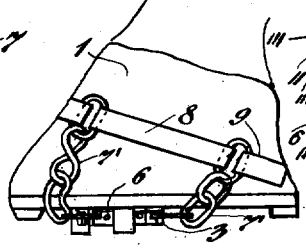
Fig. 3.
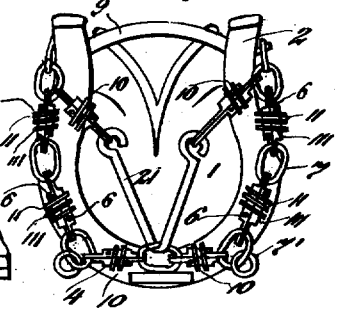
Fig. 4.
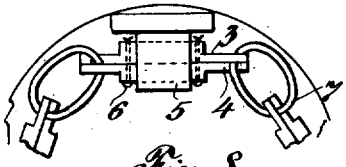
Fig. 5
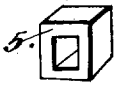
Fig. 6.
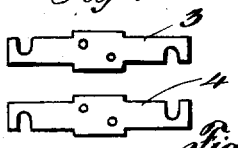
Fig. 7.
Fig. 8.
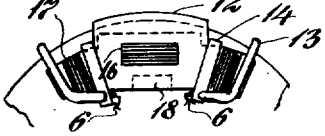
Fig. 15
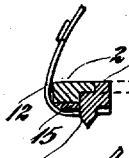
Fig. 9
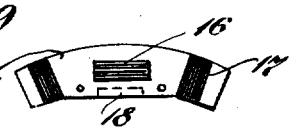
Fig. 14.
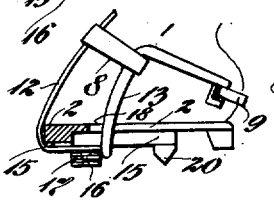
Fig. 10
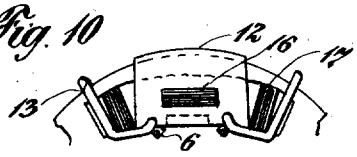
Fig. 11.
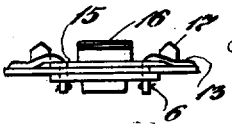
Fig. 12
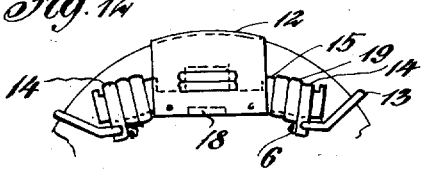
Fig. 13.
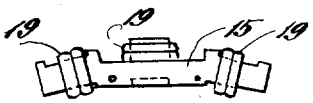
INVENTOR.
J. O. Fowler.

J. O. FOWLER.
SAFETY TREAD.
APPLICATION FILED APR. 29, 1920.
Reissued July 5, 1921.
15,137.
2 SHEETS—SHEET 2.
Fig. 18.
Fig. 16.
Fig. 17.
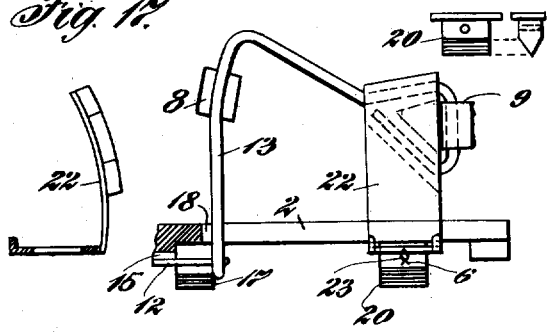
Fig. 19.
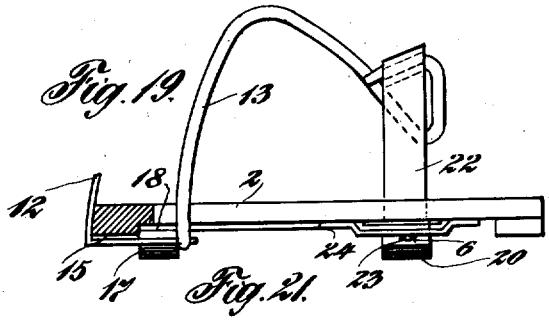
Fig. 20.
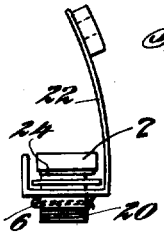
Fig. 21.
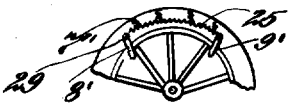
Fig. 25.
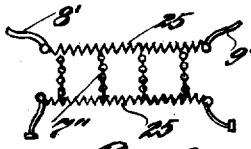
Fig. 22.
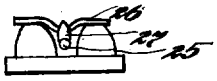
Fig. 24.
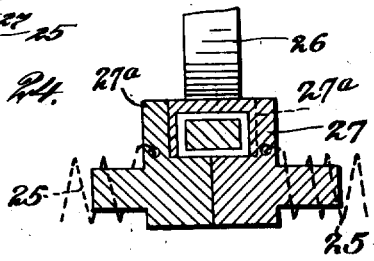
Fig. 23.
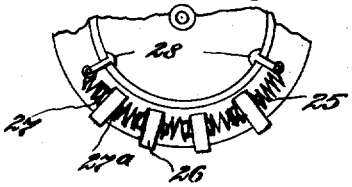
INVENTOR.
J. O. Fowler.

UNITED STATES PATENT OFFICE.

JONATHAN O. FOWLER, OF NEW YORK, N. Y.

SAFETY-TREAD.

15,137. Specification of Reissued Letters Patent. Reissued July 5, 1921.

Original No. 1,183,365, dated May 16, 1916, Serial No. 72,041, filed January 14, 1916. Application for reissue filed April 29, 1920. Serial No. 378,318.

*To all whom it may concern:*

Be it known that I, JONATHAN O. FOWLER, a citizen of the United States of America, and a resident of New York, in the county and State of New York, have invented a certain new and useful Safety-Tread, of which the following is a specification, the same being a full, clear, and exact description of the invention, such as will enable others skilled in the art to which it appertains to make and use the same, this application being a continuation in part of my application, Serial No. 588,995, filed October 25, 1910, and patented January 18, 1916, No. 1,169,074.

This device relates to non-slipping devices, such as sandals or emergency overshoes for horses, ice creepers, non-skidding attachments for tires and other articles designed to afford protection against sliding on slippery places.

To attain the desired end the invention consists in the construction and arrangement of parts hereinafter set forth, and illustrated in the drawings, in which—

Figure 1 is a bottom view, and Fig. 2 a side elevation of a horse's hoof equipped with my invention; Fig. 3 is another bottom view of a hoof on which is mounted a safety-tread in which my invention is embodied; Fig. 4 is a view in detail of a calk, calk-holder, and connecting links; Fig. 5 represents a calk, and Figs. 6 and 7 calk holders; Fig. 8 is a plan view of another calk and calk-holding means constructed according to my invention; Fig. 9 is a detail view of a calk used with the latter; Fig. 10 represents the last-named calk used in connection with another calk-holding means; Fig. 11 is an elevation of the same, and Fig. 15 a section thereof; Fig. 12 is a plan view of a calk and calk-holding means; Fig. 13 is a detail view of calk used with the latter; Fig. 14 is an elevation in which is shown a calk with front and rear projections; Fig. 16 is an elevation of separate front and rear calks and a holder therefor; Fig. 17 is a detail of a portion of the calk holder; Fig. 18 is a detail of the rear calk; Fig. 19 is an elevation, and Fig. 20 a side view of connected front and rear calks and a holder therefor; Fig. 21 is an elevation of my safety-tread applied to a vehicle wheel; Fig. 22 is a plan view thereof; Fig. 23 is an elevation of another tread constructed according to my invention applied to a wheel; Fig. 24 is a side view thereof; and Fig. 25 is a sectional detail view of the duplex holder shown in Fig. 23.

Referring to the drawings, 1 denotes the foot of a horse, and 2 the ordinary shoe thereof, on which is mounted a sandal comprising a plurality of detachable calk holders, as 3 and 4, which may carry a calk, as a hollow block 5, adapted to be held on the said calk by positioning devices, as the pins 6. The calk holders are connected together by a flexible strand, as by links 7. The tread is held to the hoof by attaching means, as links 7′ and straps 8 and 9. By the use of a plurality of connected links a certain freedom of movement is attained in the tread, and I may increase the same by substituting upon the duplex calk holders 3 and 4, resilient calks, as a series of rings 10 or convolutions comprising coils 111, in place of the calks 5. In the latter case the action of the horse, in first putting his toe to the ground to obtain a foothold and then in exerting a strain on the tread in a relatively backward direction, will temporarily compress the convolutions of the coils 111 which move relatively rearward along the tread. Upon raising his foot again, the coils will exert a reactive force against the positioning means 7 and will again resume their normal positions. The calks 11 forming the rear convolutions of the coils 111 thus have an oscillating movement, moving first opposite to the direction of travel while engaged with the ground, and when released, resuming their normal positions along the supporting means.

The front and rear portions of the hoof attachment may be connected, as by a link 21. The hoof-attaching means may comprise, in connection with straps, as 8 and 9, calk-holding means, as a plate 12, and two preferably practically rigid side links, as 13, which may be used in lieu of flexible links 7′. The plate 12 rests upon the front of the hoof and is turned under the shoe and is preferably perforated to allow the projection, as 16, of the therebelow positioned calk 15 to pass therethrough. The links 13, also attached by straps 8 and 9, pass down the sides of the hoof and beneath the same adjacent to side projections, as 17, and sometimes through bands, as 14, encircling the calk 15 and the plate 12, the parts being held in position by the turned ends of the links 13, with or without the use of cotter-pins 6 which may pierce the exterior ends of the links 13. The bands 14 may be dispensed with and the ends of the links 13 be passed through, or positioned adjacent to, the plate 12, and in that case the calk may be held in position by the ends of the links 13, or by cotter-pins 6, or by both. The calk 15 may also have a projection, as 18, extending from its opposite face, and adapted to rest against the rear edge of the front portion of the shoe. In lieu of integral projections the calk may carry a plurality of rings, as 19, or, if preferred, a coil, as 111 (not shown), encircling the same, which rings as well as the calk may be detached at will from the tread. To this end I sometimes make the calk holder in duplex form, as 3 and 4, which parts may be held together, and the calk also held in position, by screws, rivets, cotter-pins, or other positioning means. If desired, the calk, as 15, may be extended rearwardly under the shoe and may carry a projection or supplemental calk, as 20, to contact the ground. The rear calks 20 may be used in a detachable relation as regards the calks 15, as where they are held in side frames 22 engaged with the cross links 13 and strap 9 and secured to the said frames, as by pins 23 or cotter-pins 6. Or, if preferred, the said rear calks 20 may be inserted in a spring frame 24 passing under the shoe, and preferably lying adjacent to the calk 15, and being held in operative position by side frames 22 in the manner indicated above.

My non-slipping device may be applied to the tires of wheels to prevent skidding of the same, in which case I may use a series of elastic or flexible devices, as spring strands 25, connected to calks, as cross strands comprising links 7″. In operation, by the rolling contact with the ground, there will be exerted a strain on the tread, as the rearward cross strand 7″, in a relatively backward direction as regards the calk in advance of the same, which stress will temporarily compress the convolutions of the adjacent coil spring. Upon the wheel moving farther around, the coil will exert a reactive force against the positioning means, as a strap 8, and the members will again resume their normal positions upon the tread being raised from the ground by the revolution of the supporting wheel. The links 7″ thus have an oscillating movement, moving at one time opposite to the direction of travel, while engaged with the ground, and, when released, resuming their original normal positions once more. Or, if desired, the elastic strands 25 may each carry calks comprising plates 26 secured thereto, as by spools or rings 27 and 27ᵃ, the elastic strands being held to the wheel by positioning means, as by bolts 28 passing through the body of the wheel.

Thus the individual coils 25 may be secured to the holders 27 or to the treads 7″, while the outer ends of the series of coils are respectively held by the positioning straps 8′ and 9′ or the bolts 28, the movement of the coils thus being inward of or between the attaching means of the coils, as the said straps or bolts.

In Figs. 3, 21, and 23, the holders for the non-slipping devices directly connected therewith and the tread elements or calks (as, for example, the sectional holder 3, 4 at a rear calk coil 11 of Fig. 3; or, in tire use, the rear element 29 at the rear calk strand 7″ of Fig. 21; or the rear movable holder 27 of the divided holders 27 and 27ᵃ at the calk plate 26 of Fig. 23) are mounted upon supports, as the hoof of a horse in Fig. 3 or a wheel in Figs. 21 and 23. In all cases the holder is preferably movable relative to the support and the tread element or calk is movable relative to the holder thereof. The said holders for the substantially alined tread elements periodically come adjacent to and bring the interchangeably usable calks 11, 7″, and 26 in contact with the ground. When a tread element, as 11, 26, or rear strand 7″ is in contact with the ground, the relative rearward movement of the support and holder with positioning pin 6, strap 8′, or bolt 28, will cause any suitable elastic means located forward of the holder and intermediate the tread element and holder (as, for example, the elastic relatively forward convolutions of the coil 111 between the calk 11 and holder 7, or the relatively forward elastic division or spaced portion of a coil 25) to become compressed in the path of travel (as by convolutions of the coil 25 being compressed between the entering holders or spools 27 and 27ᵃ which prevent any inward curving action of the convolutions) and force the forward or outer tread element and elastic means to move somewhat rearwardly relative to the support in the line of compression against the increased resistance of the relatively rearward or posterior portion of the substantially alined elastic means, as the coil 111 comprising the calk 11 of Fig. 3. The positioning means are provided not only to hold the tread element in position, but also to assist in limiting the said inward or rearward movement of the same as, in the present instance, the rearward positioning means 6 in Fig. 3, and the rearward positioning strap 8′ in Fig. 21, or the rearward bolt 28 in Fig. 23, the divisible and separable holders 3, 4 and 27, 27ᵃ entered in the convolutions serving to prevent buckling or circumferential flexion thereof which might otherwise occur. When the said tread element is moved from the ground by the subsequent movement of the support, the reaction of the said elastic means 111 will cause the released tread element 11 to travel forward relative to the support and to resume its original or normal position again, the reaction of the forward or anterior part of the elastic means augmenting that of the relatively rearward portion of the alined elastic means to force the tread element or calk back to its original relative forward position, and to cause the said coil and preferably the holder to move relatively forward with the adjacent tread element in unison, thus completing an oscillatory movement.

I have shown a number of ways in which the treads may be arranged on the support, as for example, the strands carrying the treads may be positioned so as to lie in different directions with regard to the support therefor in different cases according to the particular conditions of the use of the same. For instance, in some cases I use strands for the treads in practical alinement with the path of travel, as those located at the sides of the support in Fig. 3; or the strand 25 in Fig. 23; or the treads may be mounted on or sustained by strands that are substantially radially disposed as regards the support, as the flexible elements 8′ and 9′ in Fig. 21, or the sustaining elements of the rear treads 10 in Fig. 3 which are supported by means connected with the link 21.

The depending or inwardly projecting part of the tread 26 may lie exterior of an adjacent longitudinally engageable holder 27, 27ᵃ for the spring, as shown in Fig. 24, the said depending part and the holder serving in this case as positioning means for the tread.

In the sectional holder 3, 4 and also in the holder 27, 27ᵃ the members thereof lie adjacent to each other, while the elements of the holders 29 comprise sections which are spaced from each other. In the invention as used on motor vehicles are comprised a plurality of convolutions, a plurality of treads adjacent thereto, and flexible means located at the outer part of the device, the said flexible means being compressible and yieldable and elastic or permitting forward and rearward movement of the same, the whole being mounted upon a wheel support, which support carries a holder for the said treads and convolutions and which holder may be sectional if desired.

Each coil (and adjacent tread) is spaced from another one, the whole being arranged so that a tread and adjacent convolutions will move forwardly as regards the support from a medial or neutral point to begin an oscillatory movement as the holder brings the tread toward the ground. The relatively rearward portion of a coil is held from relative movement backward when the tread contacts the ground, and the wheel meanwhile being in motion the coil is moved rearwardly as regards the support, upon the face of the support being moved relatively rearward when contacting the ground. The said coil becomes expanded and is afterward moved relatively forwardly to the said medial point when the adjacent tread is raised from the ground by the further movement of the support, thereby completing an oscillatory movement.

What I claim as my invention is:—

1. In a device of the class described, a support, a non-slipping tread having an elastic gripping action and being movable relative to the support therefor, means to oscillate the same comprising a sectional holder mounted on the support so as to be movable relative to the latter and to periodically come adjacent to, and bring the tread in contact with, the ground, and flexible means located at the forward part of the tread, and also elastic and compressible in the path of travel to allow the tread to move in the line of compression rearwardly relative to the support against the increased resistance of the posterior elastic means, whereby, when the holder moves away from the ground, the reaction of the said elastic means will cause the tread to resume its original relative forward position.

2. In a device of the class described, a support, a non-slipping tread having an elastic gripping action and being movable relative to the support therefor, means to oscillate the tread comprising a holder attached to a plurality of elastic means and mounted on the support so as to be movable relative to the latter and to periodically come adjacent to, and bring the tread in contact with, the ground, and flexible means located at the forward part of the tread, and also elastic and yieldable in line with the elastic means rearwardly relative to the support against the increased resistance of the posterior elastic means, whereby, when the holder moves away from the ground, the reaction of the said elastic means will cause the tread to resume its original relative forward position.

3. In a device of the class described, a support, a plurality of non-slipping treads having an elastic gripping action and being movable in respect to a holder therefor, means to oscillate the same comprising a holder attached to a plurality of elastic means and mounted on the support so as to periodically come adjacent to, and bring the treads in contact with, the ground, and a plurality of flexible means forward of each tread and, when the holder is adjacent to the ground, elastic and yieldable to allow the treads to move rearwardly in line with the elastic means relative to the support, against the increased resistance of the posterior elastic means, and means to limit the rearward movement of the treads, whereby, when the holder is moved away from the ground, the reaction of the said elastic means will cause the treads to resume their relative original forward positions.

4. In a device of the class described, a support, a plurality of non-slipping treads having an elastic gripping action and being relatively movable in respect to a holder therefor, means to oscillate the same comprising a sectional holder mounted on the support so as to be movable relative to the latter and to periodically come adjacent to, and bring the treads in contact with, the ground, and flexible means forward of each tread and intermediate the adjacent treads, and, when the holder is adjacent to the ground, elastic and compressible in the path of travel to allow the treads to move rearwardly in the line of compression, relative to the support, against the increased resistance of the posterior elastic means, and means to limit the rearward movement of the treads, whereby, when the holder is moved away from the ground, the reaction of the said elastic means will cause the treads to resume their relative original forward positions.

5. In a device of the class described, a support, a plurality of non-slipping spaced devices comprising treads having an elastic gripping action and being movable relative to the support, means to oscillate each of the same comprising a holder atached to a plurality of elastic means and mounted on the support so as to be movable relative to the latter and to periodically come adjacent to, and bring the tread in contact with, the ground, and flexible means located at the forward part of and intermediate the spaced treads, said flexible means being elastic and yieldable to allow a tread when forced rearwardly relative to the support, to move in line with the said anterior elastic means, against the increased resistance of the posterior elastic means, another elastic means located in front of the first one, and a connection between the two, whereby, when a tread is in contact with the ground, the compression of the forward elastic means is added to that of the other elastic means, and when the holder is removed away from the ground by the support, the reaction of the rearward elastic means augments that of the relatively forward elastic means to force the treads to their relative original forward positions.

6. In a device of the class described, a support, a plurality of substantially alined and spaced non-slipping devices comprising treads having an elastic gripping action and being movable relative to the support therefor, means to oscillate the same comprising a sectional holder mounted on a support so as to be movable relative to the latter and to periodically come adjacent to, and bring the treads in contact with the ground, and a plurality of flexible means located at the forward part of and intermediate the spaced treads, said flexible means being elastic and compressible in the path of travel to allow each tread when forced back by the holder to move, in the line of compression, rearwardly relative to the support against the increased resistance of the posterior elastic means, another elastic means located in front of, and substantially in alinement with, the first one, and a direct connection between the two, whereby, when a tread is in contact with the ground, the compression of the forward elastic means is added to that of the other elastic means, and when the holder is moved away from the ground by the support, the reaction of the rearward elastic means augments that of the relatively forward elastic means to force the treads to their original forward positions.

7. In a device of the class described, a support, a non-slipping tread having an elastic gripping action and being movable relative to the support therefor, means to oscillate the same comprising a holder attached to a plurality of elastic means and mounted on the support so as to be movable relative to the latter and to periodically come adjacent to, and bring the tread forwardly so as to be in contact with, the ground, and substantially alined anterior flexible means located at the forward part of the tread, and elastic and yieldable to allow the tread, when forced rearwardly by and relatively to the support, to move in line with the elastic means against the increased resistance of the posterior elastic means, and means to limit the said movement of the tread, whereby, when the holder is raised from the ground, the reaction of the said elastic means will cause the tread to resume its relative original position.

8. In a device of the class described, a plurality of coils, a plurality of adjacent treads, a support therefor and for the coils, each coil and tread being spaced from another one, means to cause a tread and adjacent coil to move forwardly as regards the support from a medial or neutral point to begin an oscillatory movement as the holder brings the tread toward the ground, means to hold the relatively rearward portion of a coil from relative movement backward when the tread contacts the ground, and means to allow the coil to be moved backwardly as regards the support upon the face of the support being moved relatively rearwardly when contacting the ground, and to allow the coil to move relatively forward to the said medial point when the adjacent tread is raised from the ground by the further movement of the support, thereby completing an oscillatory movement.

9. In a device of the class described, a plurality of treads, a plurality of approximately alined elastic devices one of each on opposite sides of each tread, a support for the whole, means to hold the relatively rearward portion of an elastic device from relative backward movement when the adjacent tread contacts the ground, and means to cause the forward part of an elastic device to move backwardly relative to the support, upon the face of the latter being moved relatively rearward in use, and to allow the elastic device to move relatively forward when the said adjacent tread is raised from the ground, thereby completing an oscillatory movement.

10. In a device of the class described, a non-slipping tread having an elastic gripping action, substantially alined elastic means located on a support and movable forwardly with the tread, a relatively movable support for the said means and for the tread, a holder attached to the elastic means and carried by the support and movable relative to the latter to periodically come adjacent to and bring the tread forwardly from a medial point so as to lie in contact with the ground, means when the tread contacts the ground to hold the relatively rearward portion of the elastic means from relative backward movement as regards the support, and means to cause the forward part of the elastic means to move backwardly relative to the support, upon the face of the latter being moved relatively rearward in use, and to allow the elastic means to move relatively forward to the said medial point when the adjacent tread is raised from the ground, thereby completing an oscillatory movement.

11. In a device of the class described, a tread, a plurality of convolutions, a support therefor and for the tread, other convolutions and treads spaced from the ones first named, means to hold the rearward portion of a set of convolutions from relative movement backward when the tread contacts the ground, and means to force the forward part of the set of convolutions backward upon the support being moved relatively rearward in use, and to allow the convolutions to move relatively forward when the said adjacent tread is raised from the ground, thereby completing an oscillatory movement.

In testimony of the foregoing specification, I hereby sign the same in the city of New York, county and State of New York, this 24th day of April, 1920.

JONATHAN O. FOWLER.